(12) United States Patent
Grack

(10) Patent No.: US 9,104,884 B2
(45) Date of Patent: Aug. 11, 2015

(54) IMPLEMENTING ROLE BASED SECURITY IN AN ENTERPRISE CONTENT MANAGEMENT SYSTEM

(71) Applicant: International Business Machines Corporation, Armonk, NY (US)

(72) Inventor: Daniel E. Grack, Fountain Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 13/955,264

(22) Filed: Jul. 31, 2013

(65) Prior Publication Data

US 2015/0040234 A1 Feb. 5, 2015

(51) Int. Cl.
*G06F 17/30* (2006.01)
*G06F 21/60* (2013.01)

(52) U.S. Cl.
CPC .................................... *G06F 21/604* (2013.01)

(58) Field of Classification Search
CPC .. G06F 21/604; G06F 8/24; G06F 2221/2145
USPC ...................................................... 726/2, 27
See application file for complete search history.

(56) References Cited

U.S. PATENT DOCUMENTS

| | | | | |
|---|---|---|---|---|
| 6,014,666 | A | * | 1/2000 | Helland et al. ........................ 1/1 |
| 6,574,736 | B1 | * | 6/2003 | Andrews .......................... 726/21 |
| 8,166,071 | B1 | * | 4/2012 | Korablev et al. .............. 707/783 |
| 8,271,527 | B2 | | 9/2012 | Frieder et al. |
| 2002/0026592 | A1 | * | 2/2002 | Gavrila et al. ................ 713/201 |
| 2012/0174194 | A1 | * | 7/2012 | Furukawa .......................... 726/4 |
| 2012/0272304 | A1 | | 10/2012 | Liao et al. |

OTHER PUBLICATIONS

IBM: "P8 Content Engine Security Inheritance: role-like security and other uses"; IBM Corproation; www.ibm com/P8contentengine. . . 2012.
Oracle: "Oracle Fusion Applications Security Leveraging Oracle Identity Management"; Oracle Corporation; www.oracle.com/ whitepaper/fusionapplication . . . ; An Oracle White Paper; Sep. 2010.

* cited by examiner

*Primary Examiner* — Ali Abyaneh
(74) *Attorney, Agent, or Firm* — Teddi E. Maranzano; Farrokh Pourmirzaie

(57) ABSTRACT

A method of implementing role based security in an enterprise content management system is provided and may include creating a role object; creating a role adapter object that is communicatively coupled to the created role object; creating a security adapter object that is communicatively coupled to the created role adapter object; and associating the security adapter object to a content class.

17 Claims, 5 Drawing Sheets

IMPLEMENTING ROLE BASED SECURITY IN AN ENTERPRISE CONTENT MANAGEMENT SYSTEM

FIELD

The present disclosure relates generally to the field of computer systems, and more particularly, to role based security in an enterprise content management system.

BACKGROUND

The components of an Enterprise Content Management (ECM) system typically define and manage electronic data content including for example, Internet content, document images, e-mail messages, audio, video, and other digital representations of information (collectively referred to herein as "content"). Considering the potential volume, complexity, and variety of the objects under its management, an ECM may also include tools and other facilities for accessing and customizing components of the ECM, particularly where those components are related to securing the content. Role Based Access Control (RBAC), which assigns an end-user to a function or role, is one option for securing the content. Permissions are provided to the role, rather than to the individual user, depending upon the tasks performed by the role. An ECM may consist of several separate components, including a database server, an authentication management system, (e.g., Active Directory), and a User Interface (UI) such as, for example, a program executing as a web browser. A complete security solution may provide consistent security definitions, whether the end-user accesses the content using the UI or whether the end-user accesses the content in the database directly through facilities such as Standard Query Language (SQL). Without effective security definitions in the UI, an end-user might attempt to generate work against the content before receiving a warning message or error notification that only some of the actions are allowed. Without effective security definitions at the database, or content storage level to complement the UI security definitions, an end-user might be able to successfully access the content directly using an interface such as SQL, even though access should be denied.

It may therefore be desirable, among other things, to provide a method and system of implementing RBAC in an ECM system.

BRIEF SUMMARY

Among other things, a method and system of implementing RBAC in an Enterprise Content Management (ECM) system is provided. According to an embodiment of the invention, a computer implemented method of implementing role based security in an enterprise content management system may include creating, using a processor, a role object; creating, using the processor, a role adapter object that is communicatively coupled to the created role object; creating, using the processor, a security adapter object that is communicatively coupled to the created role adapter object; and associating, using the processor the security adapter object to a content class.

In another embodiment of the invention, a computer program product for implementing role based security in an ECM system may be provided. The computer program product may include a content manager embodied on a computer readable storage medium. The content manager may include code executable by a processor to perform a method that may include creating a role object; creating a role adapter object that is communicatively coupled to the created role object; creating a security adapter object that is communicatively coupled to the created role adapter object; and associating the security adapter object to a content class.

In another embodiment of the invention, a computer system for implementing role based security in an enterprise content management system is provided. The computer system may include one or more processors, one or more computer-readable storage devices, and a plurality of program instructions stored on at least one of the one or more storage devices for execution by at least one of the one or more processors. The plurality of program instructions may include program instructions to program instructions to create a role object; create a role adapter object that is communicatively coupled to the created role object; create a security adapter object that is communicatively coupled to the created role adapter object; and associate the security adapter object to the content class, wherein the content class inherits security definitions in response to the role object being created or modified.

BRIEF DESCRIPTION OF THE SEVERAL VIEWS OF THE DRAWING

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

As used herein, "content" may include electronic data content and digital representations of information as may be suitable for inclusion in an ECM system, such as HTML and XML documents, digital representations of photographs, Internet content, document images, e-mail messages, audio, video, textual data, and graphic images.

The term, "property" (or "properties") as used herein, generally refers to a field within a class definition. The property may contain data, such as for example an address pointing to one or more other objects, or other parameters, and may be accessed by one or more methods or functions within a highly typed extensible object-oriented data model, such as the content manager 120 component of the ECM system 100. A "security proxy property" may be referred to as a kind of property that provides a relationship between an inheriting instance of a child class, an object referred to as a "child" or "security child" and the inherited-from instance of a parent class, an object referred to as a "parent" or "security parent." When present as a property in a child, the security proxy property identifies a parent from which the child inherits security definitions.

When used herein, a "member" may refer to an end-user who has been assigned to a role within one or more components of the ECM system 100.

The term, "Role Based Access Control" (RBAC) may refer to an approach to restricting access to a resource, such as content stored in an ECM system. In RBAC, also known as "role-based security", a role may represent a job function, such as "administrator" or "auditor." The role may be assigned a variety of permissions on a variety of resources, such as content, that are associated with performing the functions of the role. One or more end-users may be assigned to the role. In contrast to security models where permissions are granted to end-users on a resource-by-resource basis, in RBAC the permissions are associated with the role, and end-users are assigned to the role, thus simplifying both end-user and resource management.

Figure 1:
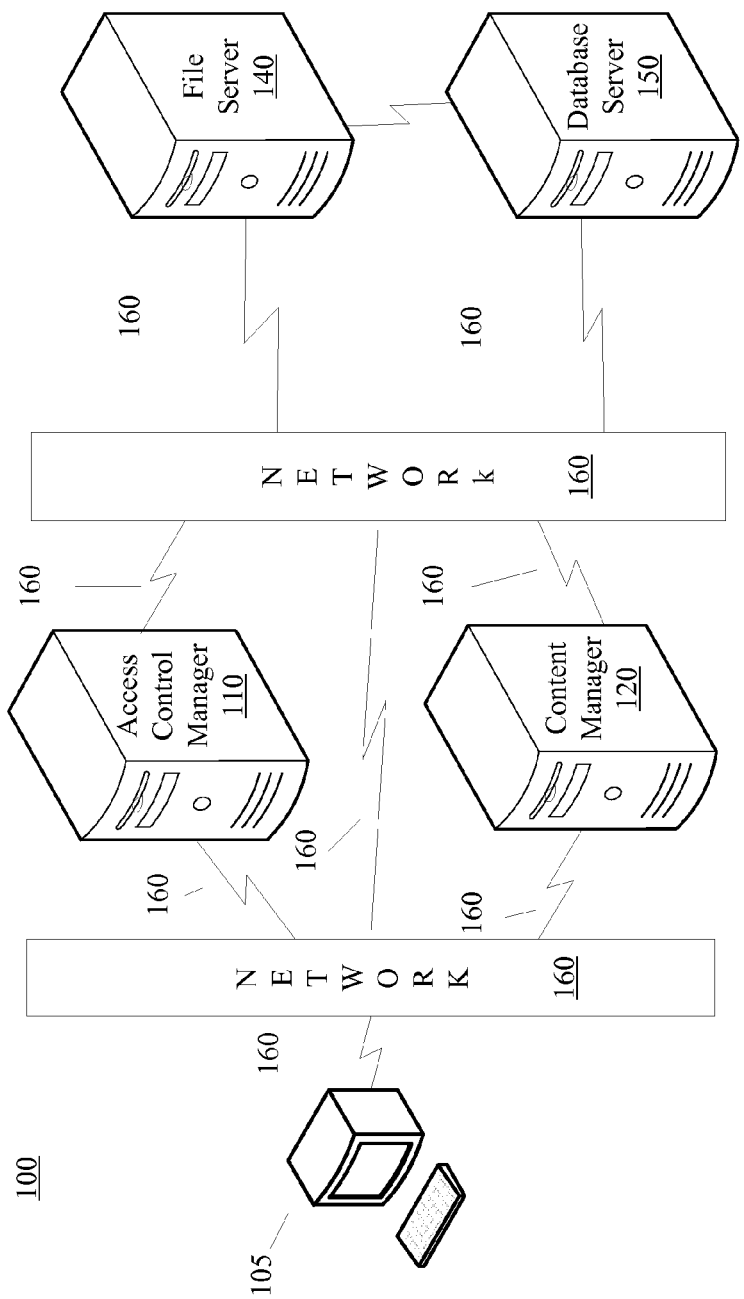
FIG. 1 is a block diagram illustrating an exemplary embodiment of an Enterprise Content Management (ECM) system.
Figure 2:
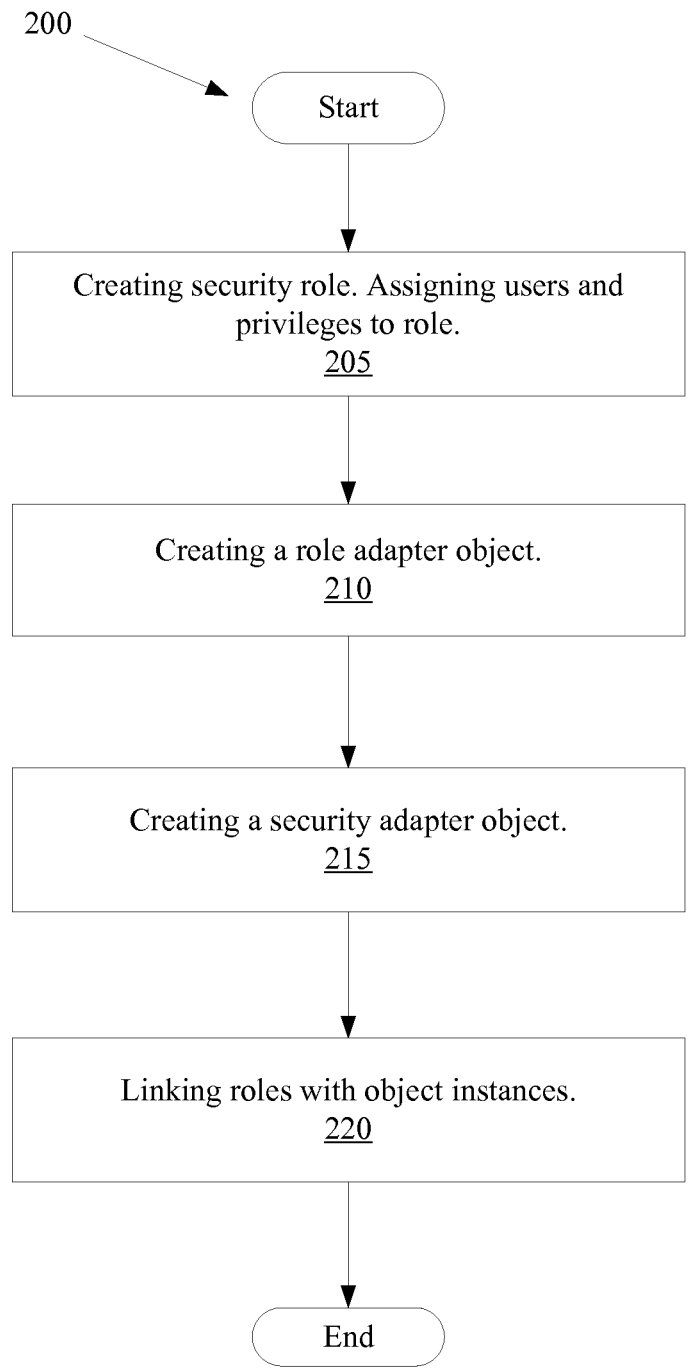
FIG. 2 is a flow chart illustrating an overview of an exemplary embodiment of a method of implementing role based security in an ECM system.

Embodiments of the present invention will now be described with reference to the figures. Referring to FIGS. 1 and 2, an Enterprise Content Management (ECM) system 100 and method 200 provide an implementation of RBAC in an ECM system. While the method 200 may be embodied in any of several programming languages or programming paradigms, one of ordinary skill in the art may appreciate the efficiency of an object-oriented paradigm in describing the relatedness of data structures. Therefore, embodiments of the invention will be discussed in terms of collections of interacting objects, classes, methods, properties, inheritance, and other object-oriented programming concepts.

FIG. 1 is a block diagram illustrating an exemplary embodiment of an ECM system 100 suitable for implementing RBAC. The ECM system 100 includes a content manager 120, and one or more data storage areas, such as a fileserver 140 and a database server 150, which are connected over one or more networks 160 to each other and to one or more end-user clients 105. The ECM system 100 may include an access control manager 110, which may provide authorization in response to requests to access content under ECM management. The ECM system 100 may include additional servers, end-user clients, and other devices not shown, and individual components of the system may occur either singly or in multiples, such as multiple data storage areas.

The content manager 120 may include one or more program modules configured for generally managing the life cycle of content in the ECM system 100, such as for example creating, modifying, archiving, versioning, and publishing the content. The content manager 120 may use the metadata associated with the content to organize and manage the content. Metadata may include a hierarchy to categorize and describe the characteristics of each type of content, including for example an author, a content creation date, a business function associated with the content, and a content type. The content manager 120 may include using metadata when evaluating requests for content from end-users or from other components in the ECM system 100. The content manager 120 may additionally provide such functions as managing a centralized repository that contains the system configuration, managing the metadata associated with the content, managing the data storage areas, such as a fileserver 140 and a database server 150, and responding to requests from the access control manager 110. The content manager 120 may organize its content and metadata using a highly typed extensible object-oriented data model, provided through properties, classes, objects, inheritance, etc.

An access control manager 110 may include one or more program modules configured to enable end-users to access and manage content stored in the ECM system 100 in a flexible manner. For example by implementing a RBAC authorization model, an end-user's access rights may be defined with granularity to control which actions may be performed on one or more given objects according to the end-user's role.

The end-user client 105 may be included as an interface through which an end-user may access the services provided by ECM system 100, such as for managing, viewing, altering, and adding content, among other activities. In one exemplary embodiment, the end-user client 105 may be provided as a web-based User Interface (UI). Alternatively, the end-user client 105 may be embodied as a stand-alone workstation in a client-server model where applications or tools are distributed from a central server in the ECM system 100 to execute locally on the workstation. One or more of the components in the ECM system 100 may further provide an Application Program Interface (API) through which the ECM system 100 may be customized according to a business enterprise's requirements.

The content manager 120, the access control manager 110, and the end-user client 105 may each be implemented in the form of separate processing systems, or may be in the form of software modules. A processing system may be implemented by one or more of any conventional or other computer or processing systems equipped such as that illustrated in FIG. 5. The content manager 120, access control manager 110, and end-user client 105 may be co-located, or may be linked together to communicate over one or more networks, such as a network 160. If embodied in software, the functions embodied by the content manager 120, end-user client 105, and access control manager 110 may be expressed as one or more specialized program modules residing within a computer environment such as that shown in FIG. 5.

Data storage areas, such as the fileserver 140 and the database server 150 may be local to the content manager 120 or remote from and in communication with the content manager 120 via one or more networks 160. The data storage areas may be implemented by any quantity of any type of conventional or other databases (e.g., network, hierarchical, relational, object, etc.) or storage structures (e.g., files, data structures, disk or other storage, etc.). The data storage areas may store any desired information arranged in any fashion (e.g., tables, hierarchical, relations, objects, etc.), and may store additional information such as metadata.

Referring now to FIG. 2, the reference numeral 200 generally designates a flow chart illustrating an overview of an exemplary embodiment of a method of implementing RBAC in the content manager 120 (FIG. 1) component of an ECM system, such as the ECM system 100 (FIG. 1). The content manager 120 component (FIG. 1) provides lifecycle management of content within the ECM system 100 (FIG. 1). Tasks related to lifecycle management of the content include creating, classifying, securing, and scheduling content for archival or disposal. The content manager 120 (FIG. 1) may provide several constructs, such as classes, to efficiently perform these tasks and manage the content, including for example a folder, a link, a document, and a record. One skilled in the art of the object-oriented data model may recognize that in a highly typed extensible object-oriented data model, a class provides a blueprint or prototype from which objects are created. Therefore, executing the blueprint or prototype for a class, such as the folder class, creates an object instance of the class, such as a folder object.

Using, for example the UI on the end-user client 105 (FIG. 1), at 205 an end-user with appropriate administrative authority may create or modify one or more role objects 310 (FIG. 3) that are created from role definitions. The role object 310 (FIG. 3) includes one or more members along with the permissions, also called access rights, which a member of the role may need when performing the tasks of the role.

However, the permissions associated with a role are referred to as complex permissions since each one may comprise one or more primitive, or basic, permissions that may apply to different kinds of objects. In general, a primitive may be an operation or permission, for example, which may require direct knowledge of the underlying implementation of the object in order to operate as expected. Where two objects may be in communication, an adapter object may act as a linking mechanism where the objects have unlike communication interfaces. Therefore, at 210, the complex permissions are mapped, or translated, to primitive permissions, and an object that may be referred to as a role adapter object is created.

The role adapter object 320 (FIG. 3) may be an instance of a predefined class that is known within the ECM system 100 and that is customized for the purpose of serving as an adapter object. Alternatively, the role adapter object 320 (FIG. 3) may be an instance of a new class created for use as an adapter object. Upon creation, the role adapter object 320 (FIG. 3) includes an Access Control List (ACL), among other properties. The ACL may include the mapped primitive permissions for the role, a list of members in the role and an object to which the role applies. As an adapter object, the role adapter object 320 (FIG. 3) contains a security proxy property link 311 (FIG. 3) to the associated role object 310 (FIG. 3), from which the role adapter object 320 (FIG. 3) may accept updated security definitions when the associated role object 310 (FIG. 3) may be modified. The role adapter object 320 (FIG. 3) also contains a security proxy property link 333 (FIG. 3) to a security adapter object 330, through which the role adapter object 320 (FIG. 3) may pass security definitions that it receives from the role object 310 (FIG. 3).

Figure 3:
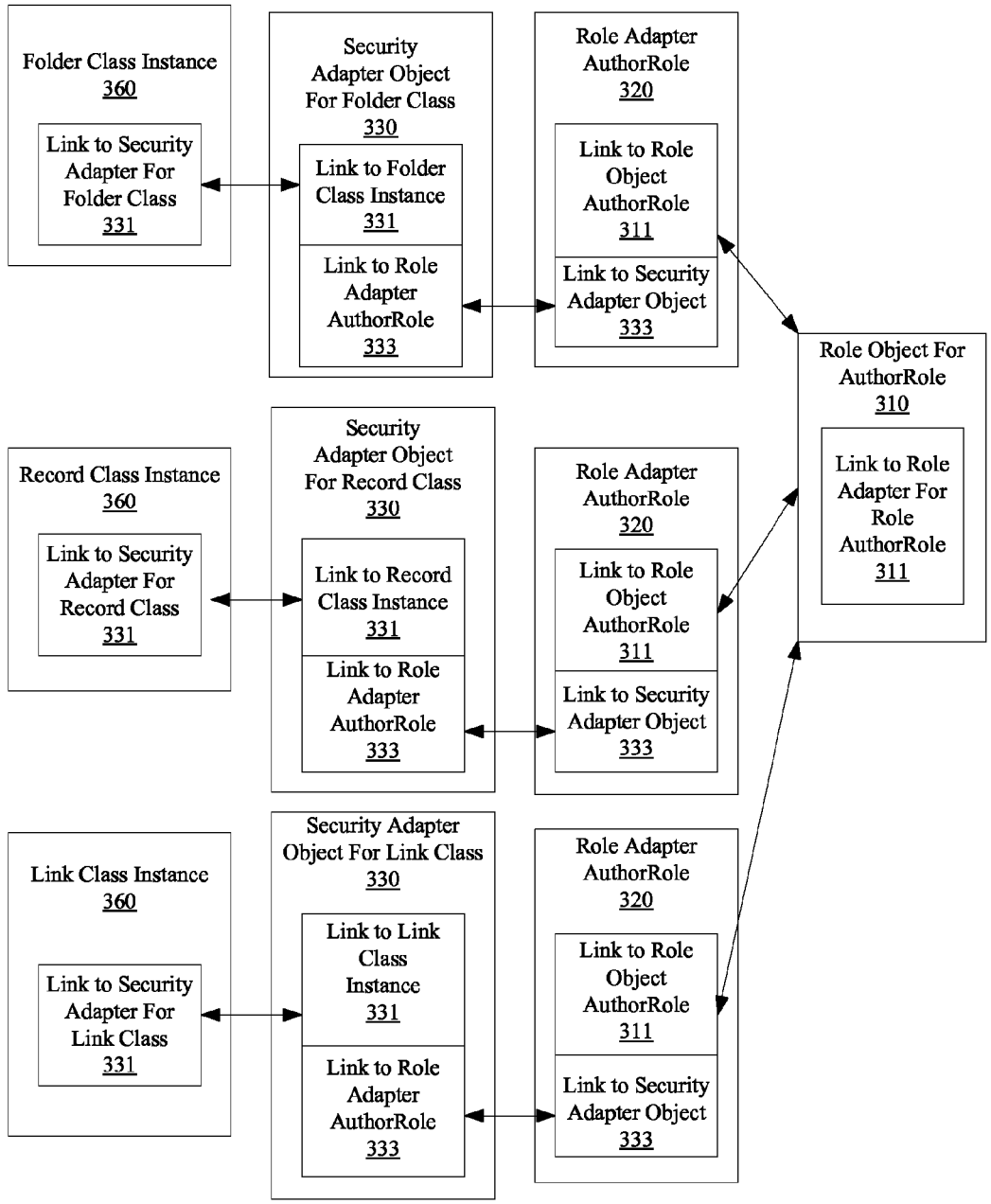
FIG. 3 is a block diagram illustrating an exemplary embodiment of relationships among classes using Role Based Access Control (RBAC) in a content manager component of an ECM system.

At 215 another adapter object that may be referred to as a security adapter object 330 (FIG. 3) is provided to act as a linking mechanism between a role adapter object 320 (FIG. 3) and a class instance 360 (FIG. 3). As depicted in FIG. 3, a one-to-one relationship is provided between a class instance 360 (FIG. 3) and a security adapter object 330 (FIG. 3) through a security proxy property link 331 (FIG. 3). Thus, a security adapter object 330 (FIG. 3) may contain one or more security proxy links 333 (FIG. 3) where more than one role objects 310 (FIG. 3) provide security definitions for the class instance 360 (FIG. 3). To maintain the one-to-one relationship, a new security adapter object 330 (FIG. 3) is generated for each new class instance 360 (FIG. 3) that may be defined.

At 220, the object instance may be linked to one or more roles. More particularly, when a content class is instantiated, the class instance 360 (FIG. 3) inherits its security definitions through the security proxy link 331 (FIG. 3) to the associated security adapter object 330 (FIG. 3).

Referring to FIG. 3, the reference numeral 300 generally illustrates an exemplary embodiment of relationships among objects in a content manager component of an ECM system.

In operation, FIG. 3 is an illustration of the objects and their relationships that are involved when a member of a role, here for example a user-defined role named AuthorRole, executes an operation to copy a record from one folder to another. FIG. 3 also illustrates that the more complex permissions in the role object 310 map into primitive permissions as part of the creation of the role adapter object 320. Copying a record requires a variety of permissions on at least three classes of objects: a folder object (both an originating and a destination), a record object, and a link object. An end-user would be provided the ability to modify the properties of each class of object involved in the copy operation. Additionally, the end-user would be provided permissions to unfile from the originating folder and to file into the destination folder. Where a link object is associated with the operation, the end-user would also be provided permissions to create the link object and modify its properties. FIG. 3 illustrates how a role adapter object 320 is generated for each class of content that requires permissions based on the complex permissions that are mapped from the role object 310. The security proxy property link 311 associates the role object 310 and the role adapter object 320. The one-to-one relationship between the security adapter object 330 and the class instance 360, in this example, a link object, is created. A class instance 360, in this example a link object, is created as part of carrying out the copy operation. In turn, a security adapter object 330 is generated and associated with the class instance 360 by the security proxy property 331. Additionally, a security proxy property 333 is created that contains the role adapter object 320 from which the link class instance 360 inherits security definitions. Since more than one role may specify security definitions for the same class instance 360, a security adapter object 330 may contain more than one security proxy property, one for each role.

The security proxy property 331 establishes a parent-child relationship, whereby the class instance 360, referred to as the security child, inherits security definitions from the associated security adapter object 330, referred to as the security parent. Similarly, the security proxy property 333 establishes the security adapter object 330 as the security child of the associated role adapter object 320, its security parent. Finally, the security proxy property 311 establishes the role adapter object 320 as the security child of the role object 310. As a result of the security inheritance relationships established through the security proxy properties, creating a new role, or modifying an existing role results in the security definitions being dynamically updated for each class instance 360 in the ECM system 100 that may be affected by the change.

Figure 4:
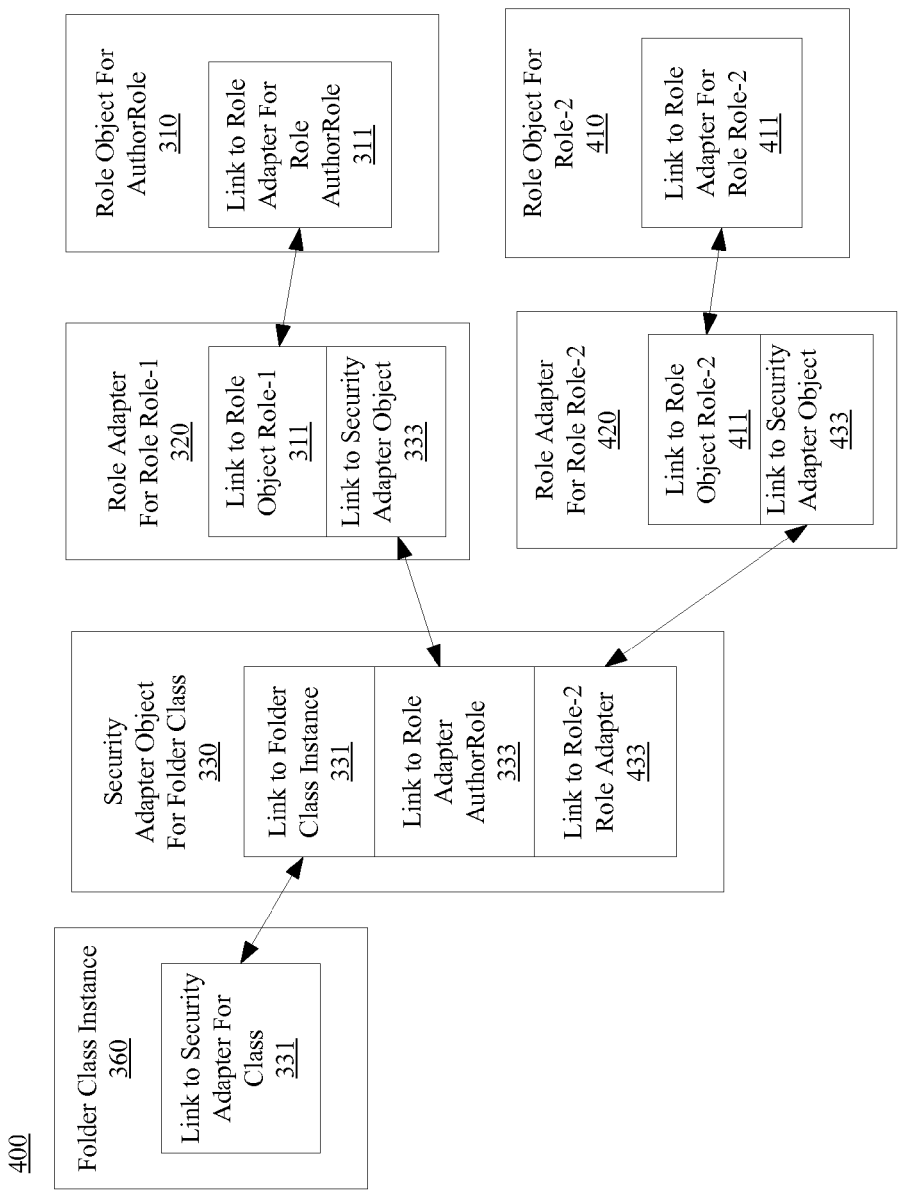
FIG. 4 is a block diagram illustrating a variant of the exemplary embodiment illustrated in FIG. 3.

Referring now to FIG. 4, the reference numeral 400 generally illustrates a variant of the exemplary embodiment illustrated in FIG. 3. The class instances 360 (FIG. 3) for the record class and the link class, along with their associated security adapter objects 330 are omitted in FIG. 4 for simplification, but their inclusion would otherwise apply. An additional role object 410 is provided to illustrate the relationships among the objects in a content manager 120 (FIG. 1) that includes more than one role. FIG. 4 uses a second role object 410 to illustrate the one-to-one relationship between the role object 410 and the role adapter object 420 using the link 411 property relating them. The role provided by role object 410 also includes accessing the class instance 360. Therefore, the link 433 property may also be stored in the security adapter object 330 for the class instance 360, which now inherits its security definitions from both the role object 310 and the role object 410.

Figure 5:
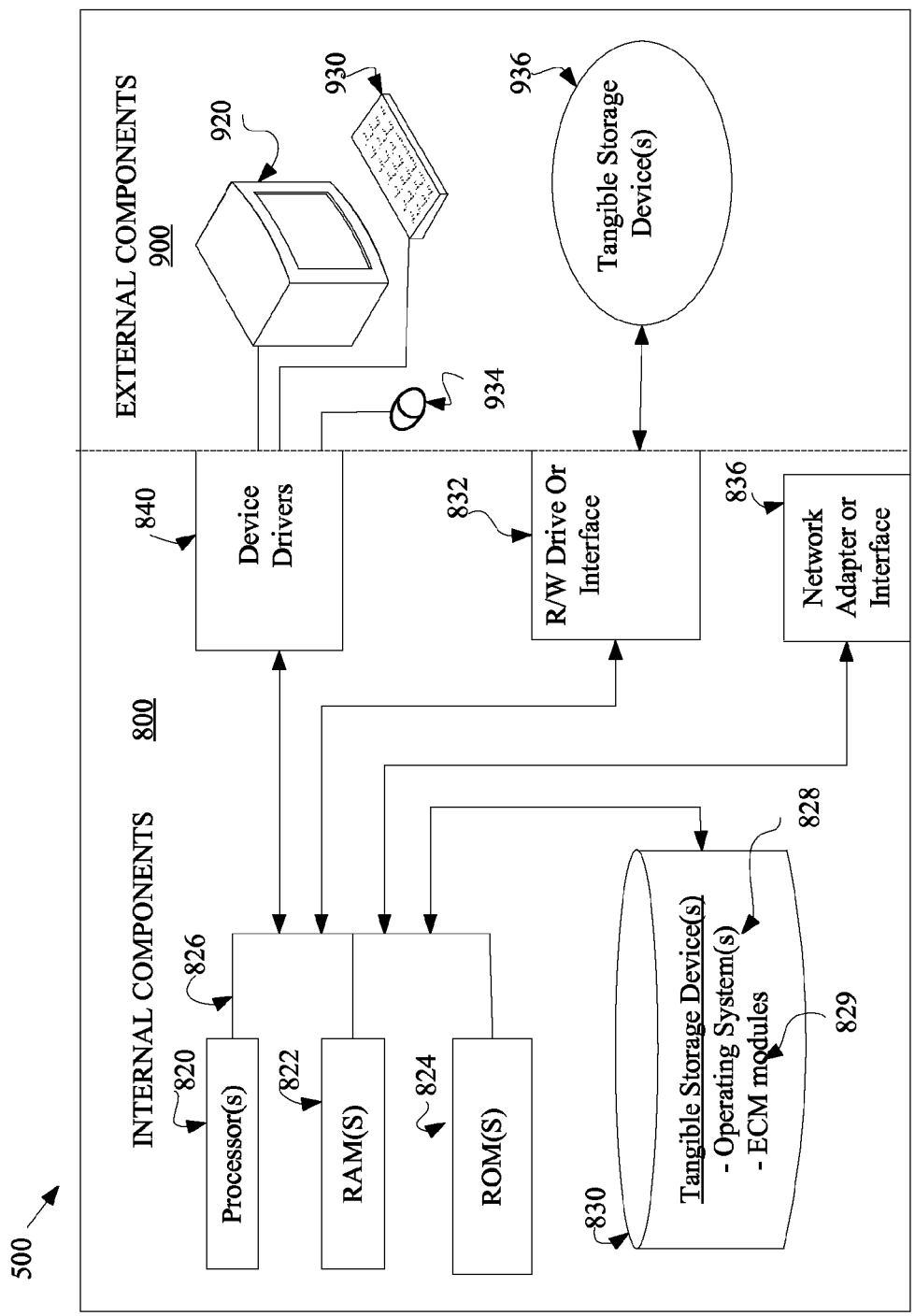
FIG. 5 is a block diagram of hardware and software of the computer environment according to an embodiment of the system illustrated in FIG. 1.

Referring now to FIG. 5, computing device 500 may include respective sets of internal components 800 and external components 900. Each of the sets of internal components 800 includes one or more processors 820; one or more computer-readable RAMs 822; one or more computer-readable ROMs 824 on one or more buses 826; one or more operating systems 828; one or more software applications (e.g., ECM modules 829); and one or more computer-readable tangible storage devices 830. The one or more operating systems 828 are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 500, can be downloaded to computing device 500 from an external computer (e.g., server) via a network (for example, the Internet, a local area network or other, wide area network) and respective network adapters or interfaces 836. From the network adapters (or switch port adapters) or interfaces 836, the operating system 828 associated with computing device 500 is loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in FIGS. 1-5 illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method of implementing role based security in an enterprise content management system comprising:
    creating, using a processor, a role object;
    creating, using the processor, a role adapter object that is communicatively coupled to the created role object;
    creating, using the processor, a class for the role adapter object;
    creating, using the processor, a security adapter object that is communicatively coupled to the created role adapter object;
    adding, using the processor, a security proxy property link to role object;
    adding, using the processor, a security proxy property link to the security adapter object;
    mapping, using the processor, one or more complex permissions from the role object to one or more primitive permissions;
    creating, using the processor, an Access Control List (ACL) based on the mapped primitive permissions, one or more members assigned to a role, and a content class associated with the role;
    associating, using the processor the security adapter object to the content class; and
    instantiating, using the processor, the role adapter object using a program.

2. The method of claim 1, wherein creating the role object further comprises:
    creating, using the processor, a class for the role object;
    adding, using the processor, one or more members from the role;
    adding, using the processor, one or more complex permissions from the role;
    adding, using the processor, one or more security proxy property links to one or more respective role adapter objects based on the role adapter object being associated with the content class; and
    instantiating, using the processor, the role object.

3. The method of claim 1, wherein creating the security adapter object further comprises:
    creating, using the processor, a class for the security adapter object;
    adding, using the processor, a security proxy property link from the security adapter object to one or more role adapter objects;
    adding, using the processor, a security proxy property link to the content class; and
    instantiating, using the processor, the security adapter.

4. The method of claim 1, wherein:
    the content class inherits security definitions from the role object based on the content class being associated with the security adapter object through the security proxy property in the content class;
    the security adapter object passes security definitions from the role adapter to the security adapter object through the security proxy property in the security adapter object; and
    the one or more role adapter objects is mapped to the role object.

5. The method of claim 1, wherein:
    the content class is a security child of the security adapter object;
    the security adapter object is a security child of the role adapter object; and
    one or more role adapter objects is mapped to the role object.

6. The method of claim 1, wherein the content class inherits security definitions in response to the role object being created or modified.

7. The method of claim 1, wherein the content class includes:
    a folder class; a record class; a document class; a link class; and a custom class.

8. A computer program product for implementing role based security in an enterprise content management system, the computer program product including a content manager embodied on a computer readable storage device, the content manager including code executable by a processor to perform a method comprising:
    creating a role object;
    creating a role adapter object that is communicatively coupled to the created role object;
    creating a class for the role adapter object;
    creating a security adapter object that is communicatively coupled to the created role adapter object;
    adding a security proxy property link to the associated role object:
    adding a security proxy property link to the associated security adapter object;
    mapping one or more complex permissions from the role object to one or more primitive permissions;
    creating an Access Control List (ACL) based on the mapped primitive permissions, one or more members assigned to a role, and a content class associated with the role;
    associating the security adapter object to the content class; and
    instantiating the role adapter object.

9. The computer program product of claim 8, wherein creating the role object further comprises:
    creating a class for the role object;
    adding one or more members from the role;
    adding one or more complex permissions from a role;

adding one or more security proxy property links to one or more respective role adapter objects based on the role adapter object being associated with the content class; and instantiating the role object.

10. The computer program product of claim 8, wherein creating the security adapter object further comprises:
creating a class for the security adapter object;
adding a security proxy property link from the security adapter object to one or more role adapter objects;
adding a security proxy property link to the content class; and
instantiating the security adapter.

11. The computer program product of claim 8, wherein:
the content class inherits security definitions from the role object based on the content class being associated with the security adapter object through the security proxy property in the content class;
the security adapter object passes security definitions from the role adapter to the security adapter object through the security proxy property in the security adapter object; and
the one or more role adapter objects is mapped to the role object.

12. The computer program product of claim 8, wherein:
the content class is a security child of the security adapter object;
the security adapter object is a security child of the role adapter object; and
one or more role adapter objects is mapped to the role object.

13. The computer program product of claim 8, wherein the content class inherits security definitions in response to the role object being created or modified.

14. The computer program product of claim 8, wherein the content class includes:
a folder class; a record class; a document class; a link class; and a custom class.

15. A computer system for implementing role based security in an enterprise content management system, the computer system comprising one or more processors, one or more computer-readable storage devices, and a plurality of program instructions stored on at least one of the one or more computer-readable storage devices for execution by at least one of the one or more processors, the plurality of program instructions comprising:
program instructions to create a role object;
program instructions to create a role adapter object that is communicatively coupled to the created role object;
creating a class for the role adapter object;
program instructions to create a security adapter object that is communicatively coupled to the created role adapter object;
adding a security proxy property link to the associated role object;
adding a security proxy property link to the associated security adapter object;
mapping one or more complex permissions from the role object to one or more primitive permissions;
creating an Access Control List (ACL) based on the mapped primitive permissions, one or more members assigned to a role, and a content class associated with the role; and
program instructions to associate the security adapter object to the content class, wherein the content class inherits security definitions in response to the role object being created or modified.

16. The computer system of claim 15, wherein creating the role object further comprises:
creating a class for the role object;
adding one or more members from the role;
adding one or more complex permissions from the role;
adding one or more security proxy property links to one or more respective role adapter objects based on the role adapter object being associated with the content class; and
instantiating the role object.

17. The computer system of claim 15, wherein creating the security adapter object further comprises:
creating a class for the security adapter object;
adding a security proxy property link from the security adapter object to one or more role adapter objects;
adding a security proxy property link to the content class; and
instantiating the security adapter object.

* * * * *